United States Patent
Mishra et al.

(10) Patent No.: US 12,014,276 B2
(45) Date of Patent: Jun. 18, 2024

(54) DETERMINISTIC TRAINING OF MACHINE LEARNING MODELS

(71) Applicant: Google LLC, Mountain View, CA (US)

(72) Inventors: Gaurav Mishra, Sunnyvale, CA (US); Adam Joseph Roberts, Durham, NC (US); Maarten Paul Bosma, Cupertino, CA (US); Noam M. Shazeer, Jr., Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/219,555

(22) Filed: Jul. 7, 2023

(65) Prior Publication Data

US 2023/0351190 A1 Nov. 2, 2023

Related U.S. Application Data

(63) Continuation of application No. 18/130,339, filed on Apr. 3, 2023.

(60) Provisional application No. 63/326,751, filed on Apr. 1, 2022.

(51) Int. Cl.
*G06N 3/08* (2023.01)
*G06N 3/084* (2023.01)

(52) U.S. Cl.
CPC .............. *G06N 3/084* (2013.01); *G06N 3/08* (2013.01)

(58) Field of Classification Search
CPC ...................................................... G06N 3/084
See application file for complete search history.

(56) References Cited

U.S. PATENT DOCUMENTS

| | | | |
|---|---|---|---|
| 2020/0175374 A1* | 6/2020 | Hestness | G06N 3/047 |
| 2021/0004693 A1* | 1/2021 | Joglekar | G06N 3/084 |
| 2021/0216862 A1* | 7/2021 | Liu | G06N 3/08 |
| 2022/0366040 A1* | 11/2022 | Marbouti | G06N 3/09 |
| 2022/0374410 A1* | 11/2022 | Tepper | G06F 16/2365 |

OTHER PUBLICATIONS

Roberts et al., "Scaling Up Models and Data with t5x and seqio," in arXiv preprint arXiv:2203.17189 (2022). (Year: 2022).*

(Continued)

*Primary Examiner* — Ryan C Vaughn
(74) *Attorney, Agent, or Firm* — Fish & Richardson P.C.

(57) ABSTRACT

Methods, systems, and apparatus, including computer programs encoded on a computer storage medium, for training a machine learning model using a deterministic data pipeline. One of the methods may include receiving a first request to generate a deterministic training dataset: transforming raw training examples obtained from the raw data source into pre-processed training examples; assigning a unique index to each pre-processed training example; and caching the pre-processed training examples into the cache directory specified in the received first request; receiving a second request to use the deterministic training dataset to train a machine learning model, the second request specifying a start index; and in response to receiving the second request: reading, from the cache directory, the pre-processed training examples that have indices beginning from the start index; and providing the read training examples in an order of the assigned indices for use in training the machine learning model.

27 Claims, 8 Drawing Sheets

(56) References Cited

OTHER PUBLICATIONS

Barham et al., "Pathways: Asynchronous distributed dataflow for ml." Proceedings of Machine Learning and Systems 4, Apr. 2022, 20 pages.

Frostig et al., "Compiling machine learning programs via high-level tracing" Systems for Machine Learning 4.9, Dec. 2018, 3 pages.

Github.com [online], "Fairscale: A general purpose modular pytorch library for high performance and large scale training" Oct. 2020, retrieved on Nov. 30, 2023, retrieved from URL <https://github.com/facebookresearch/fairscale>, 5 pages.

Github.com [online], "Flax: A neural network library and ecosystem for JAX" May 2020, retrieved on Nov. 21, 2023, retrieved from URL <http://github.com/google/flax>, 5 pages.

Github.com [online], "Google/Seqio : Task-based datasets, preprocessing, and evaluation for sequence models" Feb. 2022, retrieved on Jun. 26, 2023, retrieved from URL <https://github.com/google/seqio>, 22 pages.

Github.com [online], "Jax" Nov. 2018, retrieved on Nov. 16, 2023, retrieved from URL <https://github.com/google/jax>, 11 pages.

Harris et al., "Array programming with NumPy" Nature 585.7825, Sep. 2020, 357-362.

International Search Report and Written Opinion in International Appln. No. PCT/US2023/017331, dated Jul. 4, 2023, 20 pages.

Lee et al., "Deduplicating training data makes language models better" CoRR, Submitted on Jul. 2021, 2107.06499v1, 20 pages.

Ott et al., "Fairseq: A fast, extensible toolkit for sequence modeling" CoRR, Submitted on Apr. 2019, arXiv:1904.01038v1, 6 pages.

Paszke et al., "PyTorch: An imperative style, high-performance deep learning library" In Advances in Neural Information Processing Systems, vol. 32, 2019, 12 pages.

Raffel et al., "Exploring the limits of transfer learning with unified text to text transformer" CoRR, Submitted on Oct. 2019, arXiv:1910.10683v1, 52 pages.

Rajbhandari et al., "ZeRO: Memory optimizations toward training trillion parameter models" CoRR, Submitted on May 2020, arXiv:1910.02054v3, 24 pages.

Rasley et al., "Deepspeed: System optimizations enable training deep learning models with over 100 billion parameters" In Proceedings of the 26th ACM SIGKDD International Conference on Knowledge Discovery & Data Mining, Aug. 2020, 3505-3506.

Shazeer et al., "Mesh-TensorFlow: Deep learning for supercomputers" In Advances in Neural Information Processing Systems, 2018, 10 pages.

Shen et al., "Lingvo: a modular and scalable framework for sequence-to-sequence modeling" CoRR, Submitted on Feb. 2019, arXiv:1902.08295v1, 17 pages.

Shoeybi et al., "Megatron-LM: Training multi-billion parameter language models using model parallelism" CoRR, Submitted on Sep. 2019, arXiv:1909.08053v1, 15 pages.

Smith et al., "Using deepspeed and megatron to train megatron-turing NLG 530B, a large-scale generative language model" CoRR, Submitted on Jan. 2022, arXiv:2201.11990v1, 44 pages.

Tensorflow.org [online], "Create production-grade machine learning models with TensorFlow" Nov. 2015, retrieved on Nov. 30, 2023, retrieved from URL <https://www.tensorflow.org/>.

Thoppilan et al., "Lamda: Language models for dialog applications" CoRR, Submitted on Jan. 2022, arXiv:2201.08239v1, 47 pages.

Vaswani et al., "Attention is all you need" CoRR, Submitted on Jun. 2017, arXiv:1706.03762v1, 15 pages.

Vaswani et al., "Tensor2tensor for neural machine translation" CoRR, Submitted on Mar. 2018, arXiv:1803.07416v1, 9 pages.

Wang et al., "Diesel: A Dataset-Based Distributed Storage and Caching System for Large-Scale Deep Learning Training" Proceedings of the 49th International Conference on Parallel Processing, Aug. 2020, 11 pages.

Wang et al., "What language model architecture and pretraining objective work best for zero-shot generalization?" CoRR, Submitted on Apr. 2022, arXiv:2204.05832v1, 26 pages.

Xu et al., "GSPMD: general and scalable parallelization for ml computation graphs" CoRR, Submitted on May 2021, arXiv:2105.04663v1, 16 pages.

Xue et al., "Byt5: Towards a token-free future with pre-trained byte-to-byte models" CoRR, Submitted on May 2021, arXiv:2105.13626v1, 17 pages.

Xue et al., "Mt5: A massively multilingual pre-trained text-to-text transformer" In Proceedings of the 2021 Conference of the North American Chapter of the Association for Computational Linguistics: Human Language Technologies, Jun. 2021, 483-498.

* cited by examiner

DETERMINISTIC TRAINING OF MACHINE LEARNING MODELS

CROSS-REFERENCE TO RELATED APPLICATION

This application is a continuation of U.S. application Ser. No. 18/130,339, filed on Apr. 3, 2023, which claims priority to U.S. Provisional Application No. 63/326,751, filed on Apr. 1, 2022. The disclosure of the prior applications are considered part of and are incorporated by reference in the disclosure of this application.

BACKGROUND

This specification relates to training a machine learning model.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network includes an output layer and one or more hidden layers that each apply a non-linear transformation to a received input to generate an output.

SUMMARY

This specification describes a system implemented as computer programs on one or more computers in one or more locations for deterministically training a machine learning model, e.g., a neural network, on training data to perform a particular machine learning task. It should be noted that, although the techniques described in this specification are largely described with reference to a neural network, the techniques can be similarly applied to other machine learning models, including a Naïve Bayes model, a Support Vector Machine model, a linear regression model, a logistic regression model, or a k-nearest neighbor model, to name just a few examples.

In this specification, "deterministic training" refers to a machine learning training process in which different data items (referred to below as "training examples") from a collection of training data are guaranteed to be retrieved (and subsequently provided to the neural network for processing during training) in a fixed and reproducible order, regardless of how the training data is maintained, or what machine learning training framework is used to train the neural network.

The fixed order can be a predetermined order that is set prior to the commencement of the training. For example, a deterministic training process will always feed a neural network with the same batch of training inputs in the same order they are obtained from a training dataset at a same given training step (also called iteration), e.g., at the first training step, the tenth training step, the hundredth training step, or the like. Conversely, during different training runs, a conventional, non-deterministic training process may feed the neural network with different batches of training inputs or the same batch of training inputs but in different order for the same given step.

In particular, using the techniques described in this specification can deterministically train a neural network even if the training data is stored on a hard disk drive where the mechanical nature of the rotating disks and moving heads adds to the burden of deterministic data access, rather than on a solid state drive. Using the techniques described in this specification can also deterministically train a neural network even if the neural network is trained under a distributing training framework, e.g., a synchronous or asynchronous training framework, that uses data parallelism to speed up training.

Particular embodiments of the subject matter described in this specification can be implemented so as to realize one or more of the following advantages.

Using the techniques described in this specification can ensure that training data can be used deterministically in order to improve the quality of the training process. In particular, using the described techniques can ensure data determinism across any of a variety of data storage mediums, including hard disk drives (which are known for their higher durability and larger storage base capacity), solid-state drives (which are known for their fast reading and writing speed), and hybrid drives. For example, using the techniques described in this specification can ensure that the next time the training data is used, e.g., to train the same or different neural networks, the indexed training examples included in the training data can be retrieved in the exact order in which they were retrieved in the previous training process. As another example, using the techniques described in this specification can make it possible to selectively skip any number of training examples that have been shown to hinder the training process and resume the training beginning from a later indexed training example.

By deterministically feeding training examples to a neural network as described in this specification, the neural network can be made fully bitwise reproducible from any previous training checkpoint, and guaranteed to produce identical results every time it processes the same training example. This can, in turn, improve the manageability, stability, or both of training process of neural networks and thus reduce the amount of computing resources necessary for the training of neural networks. The improved manageability and stability of training of neural networks can be especially significant for large-scale neural networks that are harder to train due to their immense numbers of model parameters. The deterministic ordering and the reproducibility facilitates the identification of errors in the training process. For example, problematic training examples can be identified though analysis of how training evolves. Training can be resumed from a checkpoint prior to the problematic training example and training can skip over the problematic training example. In this way, a technical tool is provided for assisting in the debugging of a training process.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
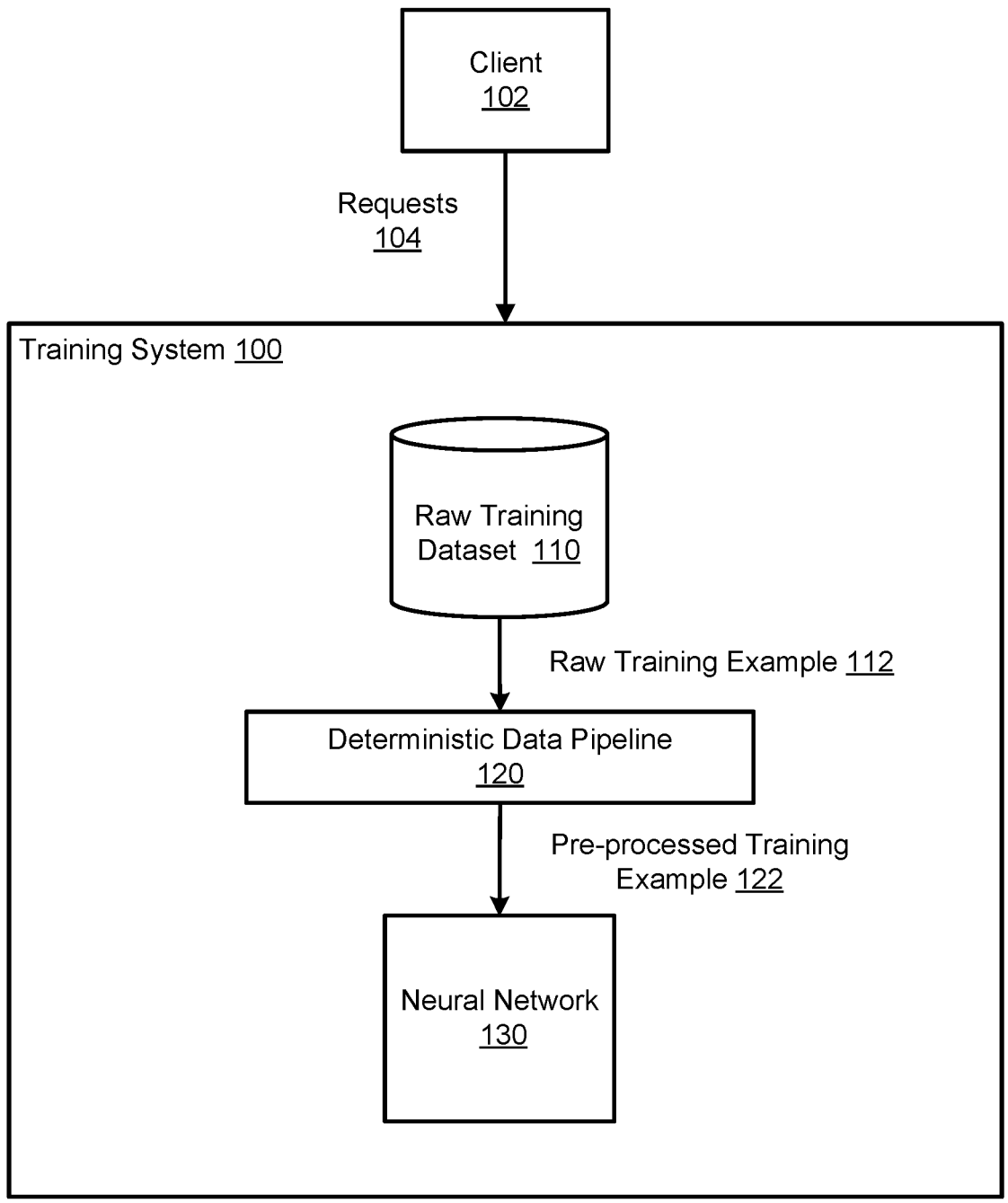
FIG. 1 shows an example training system.

FIG. 1 shows an example training system 100. The training system 100 is an example of a system implemented as computer programs on one or more computers in one or more locations, in which the systems, components, and techniques described below can be implemented.

The training system 100 includes a neural network 130 that has a set of parameters and that is configured to process a network input in accordance with the parameters to generate one or more outputs based on the network input for a machine learning task. The neural network 130 can have any appropriate architecture that allows the neural network 130 to receive network inputs of the type required by the machine learning task and to generate network outputs of the form required for the task. Examples of the neural network 130 include fully-connected neural networks, convolutional neural networks, recurrent neural networks, attention-based neural networks, e.g., Transformers, and so on. Some such example neural networks are large-scale neural networks. A large-scale neural network is a neural network with many network parameters, e.g., 1 billion parameters, 10 billion parameters, 100 billion parameters, or 500 billion or more parameters.

Generally, the training system 100 trains the neural network 130 to perform the machine learning task, i.e., to determine trained values of the parameters of the neural network 130 and outputs data specifying a trained neural network 130, i.e., data that includes at least the trained values of the parameters, in response to one or more user requests 104.

The neural network 130 can be configured through training to perform any kind of machine learning task, i.e., can be configured to receive any kind of digital data input and to generate any kind of score, classification, or regression output based on the input. The trained neural network 130 can be configured to process additional data inputs to perform the machine learning task and generate an appropriate output according to the task.

Some examples of machine learning tasks that the neural network 130 having the trained values of the parameters can be configured to perform follow.

In some cases, the neural network 130 is a neural network that is configured to perform an image processing task, i.e., receive an input image and to process the input image, e.g, process pixels values of the input image, to generate a network output for the input image. For example, the task may be image classification and the output generated by the neural network for a given image may be scores for each of a set of object categories, with each score representing an estimated likelihood that the image contains an image of an object belonging to the category. As another example, the task can be image embedding generation and the output generated by the neural network can be a numeric embedding of the input image. As yet another example, the task can be object detection and the output generated by the neural network can identify locations in the input image at which particular types of objects are depicted. As yet another example, the task can be image segmentation and the output generated by the neural network can assign each pixel of the input image to a category from a set of categories. In some other cases, the neural network is a neural network that is configured to perform an image generation task, where the input is a conditioning input and the output is a sequence of intensity value inputs for the pixels of an image.

As one example, the task may be a neural machine translation task. For example, if the input to the neural network 130 is a sequence of text, e.g., a sequence of words, phrases, characters, or word pieces, in one language, the output generated by the neural network may be a translation of the sequence of text into another language, i.e., a sequence of text in the other language that is a translation of the input sequence of text. As a particular example, the task may be a multi-lingual machine translation task, where a single neural network is configured to translate between multiple different source language—target language pairs. In this example, the source language text may be augmented with an identifier that indicates the target language into which the neural network should translate the source language text.

As another example, the task may be an audio processing task. For example, if the input to the neural network 130 is a sequence representing a spoken utterance, the output generated by the neural network may be a score for each of a set of pieces of text, each score representing an estimated likelihood that the piece of text is the correct transcript for the utterance. As another example, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can be a classification of the spoken utterance into one of a plurality of categories, for example an identity of the natural language in which the utterance was spoken. The sequence representing the spoken utterance in any of the above may be a digital audio signal or a representation derived from a digital audio signal such as a spectrogram or acoustic features.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the network output is a spectrogram, a waveform, or other data defining audio of the text being spoken in the natural language.

As another example, the task can be a health prediction task, where the input is a sequence derived from electronic health record data for a patient and the output is a prediction that is relevant to the future health of the patient, e.g., a predicted treatment that should be prescribed to the patient, the likelihood that an adverse health event will occur to the patient, or a predicted diagnosis for the patient. Such electronic health data may, for example, comprise one or more sequences of physiological data taken from a patient, with the output being a corresponding prediction that relates to those sequences of data. Examples of physiological data and a corresponding prediction include: blood glucose measurements, with the prediction being a predicted future blood glucose measurement or the prediction of a hyper- or hypoglycemic event; a heart rate, with the prediction being the presence or absence of a heart condition, or a future cardiac event; blood pressure measurements, with the prediction being the risk of a future heart condition; or the like.

As another example, the task can be a text generation task, where the input is a sequence of text, and the output is another sequence of text, e.g., a completion of the input sequence of text, a response to a question posed in the input sequence, or a sequence of text that is about a topic specified by the first sequence of text. As another example, the input to the text generation task can be an input other than text, e.g., an image, and the output sequence can be text that describes the input.

As another example, the task can be an agent control task, where the input is a sequence of observations or other data characterizing states of an environment and the output defines an action to be performed by the agent in response to the most recent data in the sequence and may cause the agent to perform the action. The agent can be, e.g., a real-world or simulated robot, a control system for an industrial facility, or a control system that controls a different kind of agent. The observations may comprise sensor data captured by sensors associated with (e.g. part of) the agent, for example visual data, LIDAR data, sonar data, agent configuration data (e.g. joint angles), agent orientation data, or the like.

As another example, the task can be a genomics task, where the input is a sequence representing a fragment of a DNA sequence or other molecule sequence and the output is either an embedding of the fragment for use in a downstream task, e.g., by making use of an unsupervised learning technique on a data set of DNA sequence fragments, or an output for the downstream task. Examples of downstream tasks include promoter site prediction, methylation analysis, predicting functional effects of non-coding variants, and so on.

In some cases, the machine learning task is a combination of multiple individual machine learning tasks, i.e., the neural network 130 is configured to perform multiple different individual machine learning tasks, e.g., two or more of the machine learning tasks mentioned above. For example, the neural network 130 can be configured to perform multiple individual natural language understanding tasks, with the network input including an identifier for the individual natural language understanding task to be performed on the network input.

In some cases, the task is a multi-modal task that requires processing both text and image inputs, so that the neural network 130 includes both a computer vision neural network and a text processing neural network. That is, the target output to be generated by the computer vision neural network for a given image depends on one or more outputs generated by the text processing neural network for one or more corresponding text inputs (and vice versa). Examples of such tasks include open-vocabulary image classification, open-vocabulary object detection, image captioning, text-based image search, image-based retrieval, and so on.

The requests 104 can be submitted by one or more clients, e.g., client 102, over a data communication network. The client 102 can for example be a personal computer (PC), a local workstation or a local server having relatively small computing resources compared to that of the training system 100. The client 102 can provide an interface to a developer. The interface can be a command-line interface (CLI), graphical user interface (GUI), or various combinations of the two and possibly another user interface (e.g., a web browser as user interface), through which the developer can develop the neural network 130, including the architecture of the neural network and the algorithms for training the neural network. By utilizing the computing resources of the training system 100 to train the neural network 130 during development, the developer may save a lot of time, be more productive and may allow a better use of the available computing resources.

The client 102 can issue a request 104 for the training system 100 to generate a deterministic training dataset from a raw training dataset 110. The raw training dataset 110 can include any data that is suitable for training the neural network 130 to perform the machine learning task. The raw training dataset 110 generally includes multiple raw training examples 112. Each raw training example in the raw training dataset 110 can have any of a variety of raw formats as appropriate for organizing the raw training examples in a database.

For example, the raw training dataset 110 can include some of the training datasets which are described in greater detail in Raffel, Colin, et al. "*Exploring the limits of transfer learning with a unified text-to-text transformer.*" arXiv preprint arXiv:1910.10683 (2019) and in Thoppilan, Romal, et al. "*Lamda: Language models for dialog applications.*" arXiv preprint arXiv:2201.08239 (2022).

The request 104 can identify the raw training dataset 110 in any of a variety of ways. For example, the request 104 can specify a storage location of the raw training dataset 110 in a storage device that is accessible by the system, e.g., can include a Uniform Resource Locator (URL) of a dataset stored on a server. As another example, the request 104 can include an identifier that identifies one of multiple raw training datasets that are already maintained by the system as the dataset that should be used as the raw training dataset 110.

The deterministic training dataset includes multiple pre-processed training examples 122. Each pre-processed training example can correspond to a raw training example included in the raw training dataset 110. Unlike the raw training examples 112 which have a raw format, however, each pre-processed training example 122 included in the deterministic training dataset has a pre-processed format that is more suitable for processing by the neural network 130. Moreover, each pre-processed training example 122 is uniquely indexed, i.e., is assigned an index that is different from the index assigned to any other pre-processed training example in the deterministic training dataset. To generate such a deterministic training dataset, the training system 100 processes the raw training examples 112 included in the raw training dataset 110 by using a deterministic dataset pipeline 120, as will be described further below with reference to FIG. 2.

Instead or in addition, the client 102 can issue a request 104 for the training system 100 to generate a deterministic mixture training dataset from two or more raw training datasets 110 identified in the request 104, and the training system 100 will then process the raw training examples 112 included in the two or more raw training datasets 110 by using the deterministic dataset pipeline 120 to generate the deterministic mixture training dataset. For example, the two or more raw training datasets 110 can represent different machine learning tasks. Like the deterministic training dataset, each pre-processed training example 122 included in the deterministic mixture training dataset has a pre-processed format and is uniquely indexed, although its index will generally be different from the index of the pre-processed training example included in the deterministic training dataset.

After issuing the request 104 to generate the deterministic training dataset (or the deterministic mixture training dataset), the client 102 (or another client) can then issue a request 104 for the training system 100 to use the deterministic training dataset (or the deterministic mixture training dataset) to train the neural network 130. For example, in the cases of the deterministic mixture training dataset, the neural network 130 can be configured as a multi-task model that will be trained to perform each of the different machine learning tasks represented by the deterministic mixture training dataset, or can be configured as a single-task model that will be first pre-trained on one or more of the tasks and then fine-tuned on the remaining (e.g., downstream) tasks.

The training system 100 can train the neural network 130 by selecting pre-processed training examples from the deterministic training dataset (or the deterministic mixture training dataset) as part of a machine learning training technique to train the machine learning model over multiple training steps. In particular, during training, the training system 100 selects the pre-processed training examples 122 in the order of the assigned indices, and correspondingly provides for processing by the neural network in that order. The training system 100 is thus able to fully track the training examples used to train the neural network 130.

The training system 100 can for example apply a gradient descent with backpropagation training technique that uses, e.g., a stochastic gradient descent, RMSprop, or Adam optimizer, or another known or learned optimizer, to optimize an objective function that is appropriate for the task that the neural network 130 is configured to perform. The exact forms of the objective function may vary across different tasks, but typically, the objective function measures a quality of the training output, e.g., that measures a difference between the training output of the neural network 130 generated based on a pre-processed training example and the known, target output (or another target output that is derived from the known, target output) of the pre-processed training example. A cross-entropy loss function, e.g., in the case of classification tasks, and a mean squared error (MSE) loss function, e.g., in the case of regression tasks, are examples of suitable objective functions that can be used by the training system 100 during the training.

At each training step of the training process, the training system 100 provides a batch of pre-processed training examples 122 from the deterministic training dataset (or the deterministic mixture training dataset) and processes the pre-processed training examples in the batch using the neural network 130 in accordance with the current values of the parameters to generate a training output for each pre-processed training example in the batch. Each batch generally has a fixed size, i.e., includes a fixed number of pre-processed training examples, e.g., 16, 64, or 256. The training system 100 determines, with respect to the parameters of the neural network 130, a gradient of an objective function that measures the overall quality of the training outputs generated by the neural network 130 for the batch of pre-processed training examples. At the end of each training step, the training system 100 applies, e.g., through backpropagation, respective updates to the current values of the parameters of the neural network 130 using the gradient determined at the training step.

The underlying computing resources that actually support the workload of the training of the neural network 130 can be provided by any of a variety of types of hardware devices of the training system 100. Further, the hardware devices can be arranged in any of a variety of network configurations, storage configurations, and/or system configurations. As one example, the hardware devices can include a set of hardware accelerator devices, e.g., ASICs, FPGAs, graphics processing units (GPUs), or tensor processing units (TPUs). As another example, the hardware devices can include a set of single, specific edge devices, e.g., a mobile phone, a smart speaker or another embedded computing device, or other edge device. In some of these examples, the hardware devices may be partially or fully distributed across different data centers. In some of these examples, the hardware devices may be connected or interconnected to one another and to other components of the system through the same data communication network, while in others of these examples, the hardware devices may be connected or interconnected through different data communication networks. In some of these examples, the hardware devices may each have their own memory device, host device, or both, while in others of these examples, some of the hardware devices may share a common memory device, a common host device, or both.

To improve the efficiency of the training, the training system 100 can additionally make use of any of a variety of model parallelism techniques, data parallelism techniques, pipeline parallelism techniques, or a combination thereof. For example, in the cases of training a large-scale neural network model across a set of hardware accelerators, the training system 100 can use the multi-way fully sharded data parallelism techniques described in more detail in Xu, Yuanzhong, et al. "GSPMD: general and scalable parallelization for ML computation graphs." arXiv preprint arXiv:2105.04663 (2021). As another example, the training system 100 can use the asynchronous gang-scheduling techniques described in greater detail in Barham, Paul, et al. "Pathways: Asynchronous distributed dataflow for ml." Proceedings of Machine Learning and Systems 4 (2022): 430-449, for effectively distributing machine learning workloads across a larger cloud-based computing system comprising many, possibly thousands, of hardware accelerators located within the same or different data centers.

Once the training system 100 trains the neural network 130, the system can provide data specifying the trained neural network for use in processing new network inputs. That is, the training system 100 can output the trained values of the parameters for later use in processing inputs using the trained neural network, e.g., by outputting to the client 102 or by storing in a memory accessible to the system.

Alternatively or in addition to outputting the trained neural network data, the training system 100 can instantiate an instance of the neural network having the trained values of the parameters, and receive inputs to be processed and use the trained neural network to process the received inputs to generate outputs and then provide the generated outputs in respect to the received inputs. The system can receive network inputs through an application programming interface ("API") offered by the system. The trained neural network can be used to process any of a variety of machine learning tasks described above.

Figure 2:
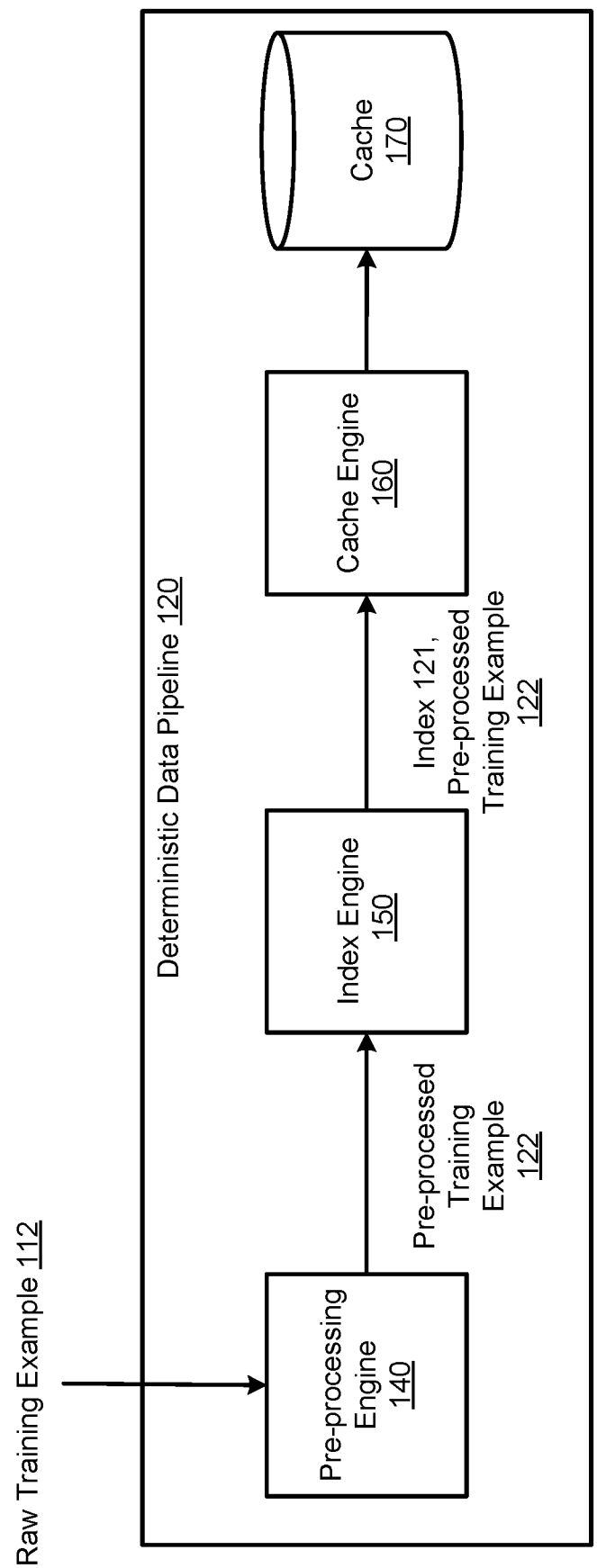
FIG. 2 is an illustration of example components of a deterministic data pipeline.

FIG. 2 is an illustration of example components of a deterministic data pipeline 120. The deterministic data pipeline 120 may be viewed as a route that a raw training example 112 takes through the training system 100, from its origin in the raw training dataset 110, such as a dataset that is identified by the request 104 issued by the client 102, through its transformation into a pre-processed training example 122 and index assignment, to its consumption by the neural network 130 during training.

The deterministic data pipeline 120 can be implemented by one or more software and/or hardware modules of the training system 110, including a pre-processing engine 140, an index engine 150, a cache engine 160, and a cache 170 of the system 102.

The pre-processing engine 140 transforms a raw training example 112 into a pre-processed training example 122. The pre-processed training example 122 can include different content, a different format of content, or both than the raw training example 112. The pre-processed training example 122 can also differ from the raw training example 112 in other aspects. The pre-processing engine 140 can do this by deleting the original content of the raw training example 112, adding additional data as new content to the raw training example 112, modifying the way the original content of the raw training example 112 is arranged, or a combination thereof and possibly using other processes. The pre-processing engine 140 can do this based on the type of the machine learning task, the configuration of the neural network, or both. The pre-processing engine 140 can also do this based on information included in the request issued by the client.

For example, a raw training example 112 from an English-to-German translation dataset may include the following sequence of characters:

{'de': 'Das ist gut', 'en': 'That is good.'}

The pre-processed training example 122 generated by the pre-processing engine 140 from the raw training example 112 will include the following sequence of characters:

{ 'inputs': 'translate German to English: Das ist gut.',
    'targets': 'That is good.'}

In this example, the pre-processed training example 122 includes a training input as a first subsequence of characters, and a target output for the training input as a second subsequence of characters, which is separated from the first subsequence by the comma punctuation mark. The target output for a given training input is the output that should be generated by the neural network 130 by processing the given training input. Further, compared with the raw training example 112, the pre-processed training example 122 replaces certain characters from raw training example with different characters, e.g., replaces 'de' with 'inputs', and includes additional characters that were not in the raw training example, e.g., "translate German to English:".

It will be appreciated that, other datasets may maintain raw training examples in various other raw formats, and the pre-processing engine 140 will process the raw training examples from those other datasets into one or more different pre-processed formats (but raw training examples from the same dataset will generally be processed to have the same pre-processed format).

As another example, the request may further specify a maximum sequence length. For example, the maximum sequence length could be defined with respect to the total number of characters that can be included in the pre-processed training example 122, or the total number of tokens that can be included in the example (after it is tokenized). In this example, after transforming the raw training examples 112 to have the pre-processed format, the pre-processing engine 140 can additionally truncate any training inputs, target outputs, or both included in the examples that are greater than the maximum sequence length to have the maximum sequence length.

As another example, the pre-processing engine 140 can apply tokenization, in accordance with a vocabulary of tokens, to the raw training examples 112 to generate the pre-processed training examples 122. Tokenization refers to the process of segmenting a sequence of characters into semantically independent elements called tokens. For example, the vocabulary of tokens can be a vocabulary that is specified in the request or another default vocabulary maintained by the training system 100. The vocabulary of tokens can include any of a variety of tokens that represent text symbols or other symbols. For example, the vocabulary of tokens can include one or more of characters, sub-words, words, punctuation marks, numbers, or other symbols that appear in a corpus of natural language text.

As further examples, the pre-processing engine 140 can also apply one or more other text pre-processing or normalization steps including, for example, lower casing, punctuation mark or stop word removal, stemming, lemmatization, masking, and the like, to the raw training examples 112 to generate the pre-processed training examples 122.

The pre-processed training examples 122 are received by the index engine 150. The index engine 150 assigns a unique index 121 to each pre-processed training example 122. The unique index 121 is typically a distinct numerical value, e.g., an integer or decimal, that is selected from a set of possible indices according to a given order. For example, the index engine 150 can incrementally assign a non-negative integer value to each pre-processed training example 122 based on the position of the raw training example 112 in the raw training dataset from which the pre-processed training example 122 was generated, such that the first pre-processed training example (generated from the first raw training example in the raw training dataset) has an index of 0, the second pre-processed training example has an index of 1, and the third pre-processed training example has an index of 2, and so on.

The pre-processed training examples 122 are received by the cache engine 160. The cache engine 160 stores the pre-processed training examples 122 in association with their assigned indices 121 in one or more databases in a cache 170 of the training system 100. For example, the cache engine 160 can store the pre-processed training examples 122 into one or more databases located one or more directories within the cache 170 that are defined in the request.

The cache engine 160 can do this by writing the pre-processed training examples 122 to the cache 170 in a persistent file format in an order of the assigned indices 121. For example, the persistent file format can be a sorted strings table (SSTable) format, where the pre-processed training examples 122 are sorted in ascending order by their indices 121. As another example, the persistent file format can be a Bigtable format or some other type of data structure format that maps pre-processed training examples 122 to their indices.

Moreover, the cache engine 160 can store the pre-processed training examples 122 in the cache 170 in a way that is compatible with the training scheme of the neural network 130. For example, to support data parallelism, a database in the cache 170 can be split into a number of smaller parts called shards, and the cache engine 160 can use any of a variety of sharding algorithms for determining which shard among the number of shards a particular pre-processed training example 122 should be written to.

In a particular example, in cases where a multi-way fully sharded data parallelism technique is adopted, the cache engine 160 can write the pre-processed training examples 121 into multiple SSTables in the order of the assigned indices 121 using a mod sharding technique. In mod sharding, for each pre-processed training example 122, the cache engine 160 performs a modulo operation on the assigned index of the pre-processed training example, and then uses the remainder to identify a shard from the number of shards to store the pre-processed training example.

In particular, during training, the pre-processed and indexed training examples will be read in the order of the assigned indices, and thus provided for processing by the neural network in the order of the assigned indices. In this way, the contents of a given training batch are a function of the training step number, and the neural network is fully bitwise reproducible from any previous training step (also referred to as a "checkpoint"). Bitwise reproducibility means that every bit of the outputs generated by the neural network by processing the same training example during different training runs are the same.

This deterministic dataset pipeline 120 can improve the overall quality of the training from a variety of technical aspects. From one technical aspect, the deterministic dataset pipeline 120 can provide insights into the training process to assist a developer to shorten the development cycle of the neural network. The insights can be especially significant for complex neural networks that are harder to train or for training neural networks to perform complex machine learning tasks.

Specifically, by virtue of the deterministic dataset pipeline it is possible to set up different checkpoints during the training, during which the neural network performance may be evaluated and/or compared so as to assist a training process manager (e.g., a human user or some automated software tool) in making more informed decisions on how the training should proceed, for example whether to replay any previous training steps, or whether to skip any training examples.

More generally, this enhances the training diagnostic capability of the system, including improved metric tracking and model visualization tooling, that can for example be used to uncover defective training examples or problematic model parameter values.

From another technical aspect, by allowing for more effective actions to be taken to resolve a computation error that might to hinder the training, the deterministic dataset pipeline 120 can result in less training needed for the neural network to converge, which corresponds to conservation of processor resources. Rather than rolling back to a previous checkpoint and then feeding newly selected batches of training examples to the restored neural network with the hope that none of the defective training example(s) which caused the error before will not be included in there, the deterministic dataset pipeline 120 can be used to guarantee that such defective training examples will never be selected again.

Specifically, assuming the neural network has been trained up to 17,000 training steps ("checkpoint 17,000") in a single run, where there occurred a sudden spike (e.g., as opposed to a smoother trend toward convergence) in the objective function used to evaluate network performance during training, the training may then be rolled back to restart from checkpoint 15,000, and the neural network is guaranteed to produce identical results in both runs from checkpoint 15,000 to 17,000.

In addition, in this example, a certain number of training examples that have been shown to hinder the training process can be selectively skipped in the restarted run, e.g., training examples that were used between checkpoints 16,000 and 17,000, so as to stabilize the training. That is, in this example, the training in the restarted run can begin from checkpoint 15,000, stop at checkpoint 16,000, and resume at checkpoint 17,000. Skipping previously processed training examples can be done by computing a start index as the product between (i) a training step number that is larger than the number of training steps that have already been performed during the training of the neural network and (ii) the batch size of each batch of training examples used in each training step, and then reading training example having indices that begin with the start index.

Figure 3:
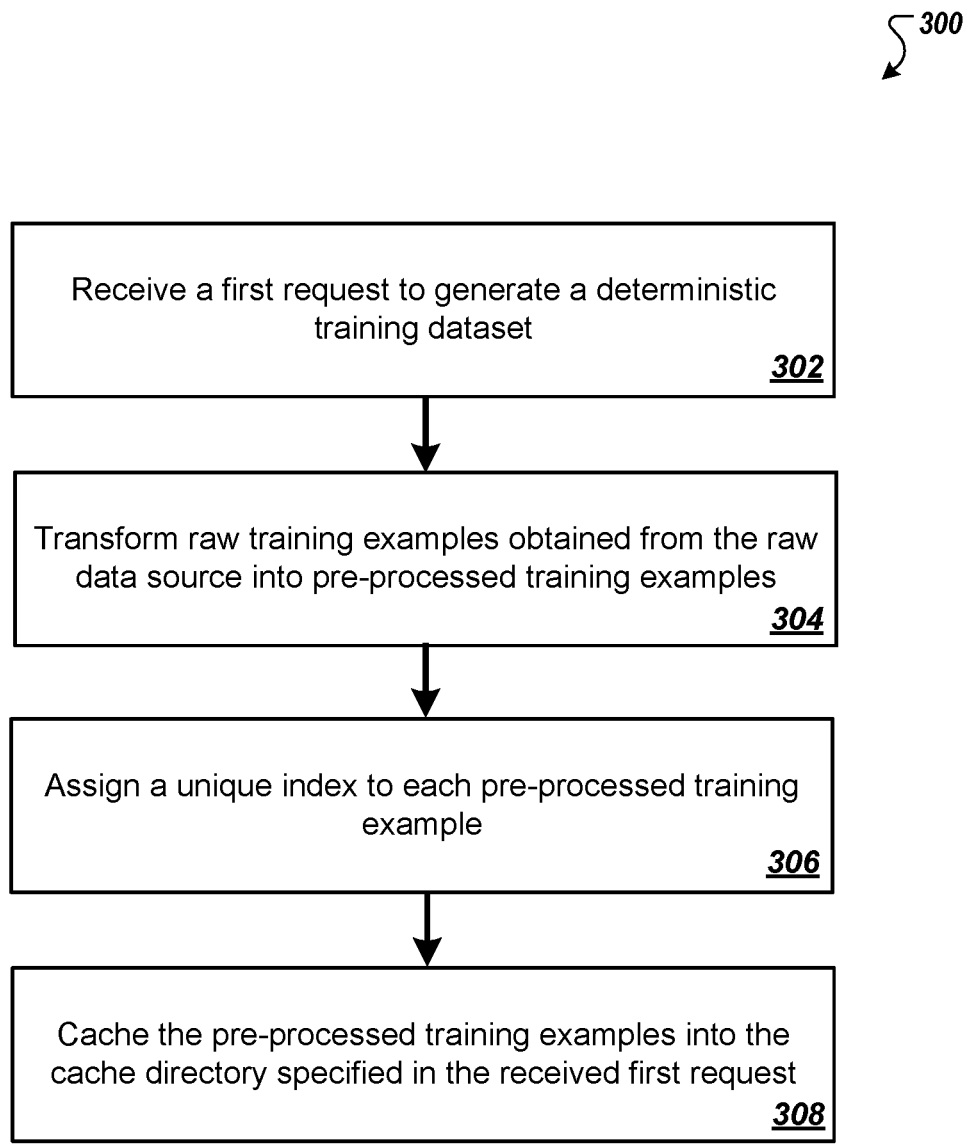
FIG. 3 is a flow diagram of an example process for generating a deterministic training dataset.

FIG. 3 is a flow diagram of an example process 300 for generating a deterministic training dataset. For convenience, the process 300 will be described as being performed by a system of one or more computers located in one or more locations. For example, a system, e.g., the training system 100 of FIG. 1, appropriately programmed in accordance with this specification, can perform the process 300. The generated deterministic training dataset may be used for training a neural network for any of the machine learning tasks described above.

The system receives a first request to generate a deterministic training dataset (step 302). The first request can specify a raw data source. The raw data source defines a storage location of the raw training dataset which includes multiple raw training examples in a storage device that is accessible by the system. The first request can also specify a cache directory. The cache directory identifies the memory locations of the cache into which the deterministic training dataset should be stored. The first request can further include additional information that specify how the raw training examples included in the raw training dataset should be pre-processed.

In response to receiving the first request, the system obtains the raw training examples, e.g., one after another in a sequential order, from the raw training dataset identified by the raw data source, and then transforms the obtained raw training examples into pre-processed training examples (step 304). The system can use a pre-processing engine, e.g., the pre-processing engine 140 of FIG. 2, to apply any number of different processes to each raw training example to generate a corresponding pre-processed training example, which can include different content, different format of content, or both than the raw training example.

The system assigns a unique index to each pre-processed training example (step 306). It is "unique" because the index assigned to a pre-processed training example will be different from any other pre-processed training example in the deterministic training dataset. In some implementations, the system assigns an index to each pre-processed training example based on the position of the raw training example in the raw training dataset from which the pre-processed training example was generated. For example, the system can use an index engine, e.g., the index engine 150 of FIG. 2, to assign each successive pre-processed training example a monotonically increasing integer value as its unique index. In other implementations, the system applies additional processes during the index step, as described in more detail below in FIG. 5.

The system caches the pre-processed training examples into the memory locations of the cache identified by the cache directory specified in the received first request (step 308). The system can do this by writing the pre-processed training examples into a persistent file format in an order of the assigned indices. For example, the persistent file format can be an SSTable format.

In some cases where the deterministic training dataset are split into multiple shards in the cache directory, the system can use a mod sharding technique to write the pre-processed training examples. Specifically, this involves repeatedly computing a modulo between the assigned index of each pre-processed training example and the total number of the shards, and then using the remainder to identify a shard from the multiple shards to store the pre-processed training example.

Figure 4:
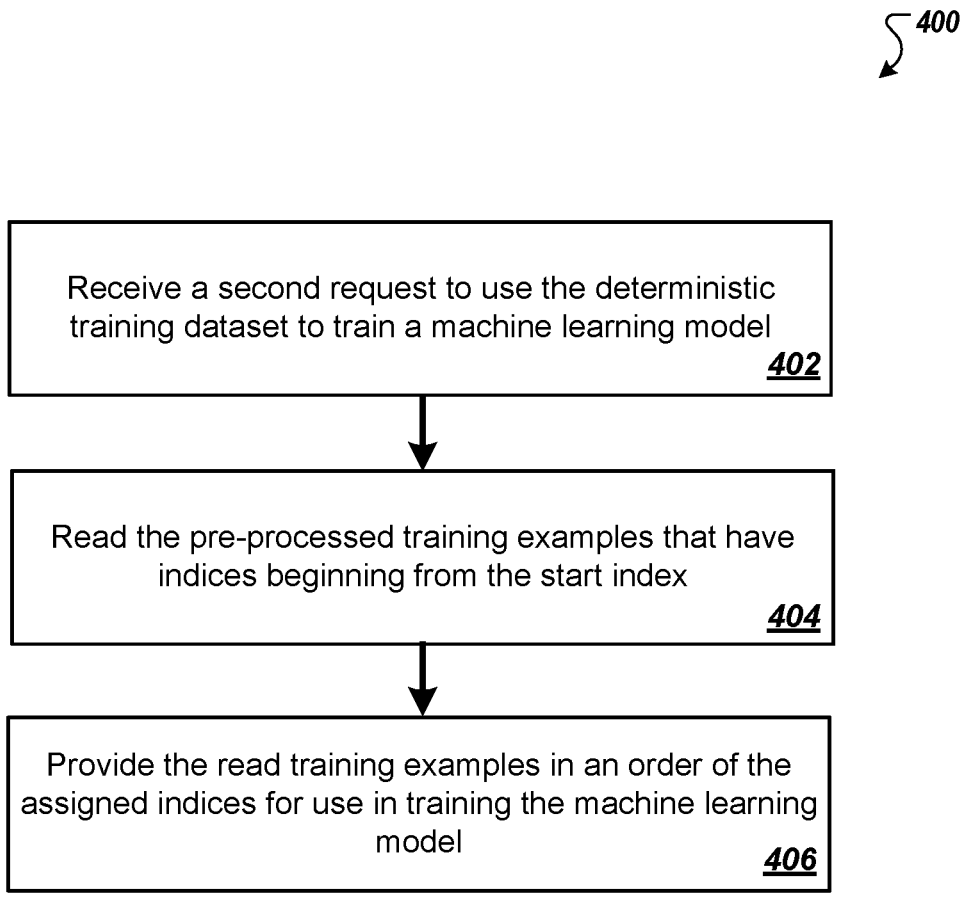
FIG. 4 is a flow diagram of an example process for using a deterministic training dataset to train a machine learning model.

FIG. 4 is a flow diagram of an example process 400 for using a deterministic training dataset to train a machine learning model for any of the machine learning tasks described above. For convenience, the process 400 will be described as being performed by a system of one or more computers located in one or more locations. For example, a system, e.g., the training system 100 of FIG. 1, appropriately programmed in accordance with this specification, can perform the process 400.

The system receives a second request to use the deterministic training dataset to train a machine learning model (step 402). The second request can include specify a start index, which indicates the beginning index of the deterministic training dataset to use for training.

The start index is dependent on a number of training steps that have been performed during the training of the machine learning model. The start index is also dependent on a batch size of each batch of training examples used in each training step. Thus, in cases where such a start index is absent in the second request, the system can compute the start index based on (i) the number of training steps that have been performed and (ii) the batch size, for example by computing the start index as a product between (i) and (ii). In these cases, information including the number of training steps and the batch size can either be given as part of the second request, or maintained by a training process manager of the system.

Moreover, in some cases, the number of training step is dependent on model performance on a particular machine learning task during the training, for example, dependent on a training loss value or a validation loss value. In these cases, the system can monitor, by using the training process manager, the training loss value, the validation loss value, or both of the objective function during the training of the machine learning model, and determine the particular training step based on the monitored value(s). For example, in response to an indication of a computation error that occurred during processing of a particular batch of pre-processed training inputs, the system can select a training step that is after that training step during which the particular batch of pre-processed training inputs were read and fed to the machine learning model, and then multiply the selected training step with the batch size to determine the start index.

In response to receiving the second request, the system reads, from the deterministic training dataset stored at the cache directory, the pre-processed training examples (step 404). In particular, the system reads the pre-processed training examples that have indices beginning from the start index. The system can read these pre-processed training examples in an order of the assigned indices, such that pre-processed training examples having successive indices are read one after another from the deterministic training dataset.

Therefore, in some cases where the second request specifies a start index that is associated with a later training step, the system will skip the pre-processed training examples in the deterministic training dataset stored at the cache directory that have indices smaller than the start index, and correspondingly will not provide those pre-processed training examples for use in training the machine learning model.

In some cases where the deterministic training dataset are split into multiple shards, the system can similarly use the mod sharding technique to read the pre-processed training examples. Specifically, this involves repeatedly identifying a shard from the multiple shards based on computing a modulo between (i) a monotonically increasing index that begins from the start index specified in the received second request and (ii) the total number of the shards, and then reading a pre-processed training example from the identified shard.

The system provides the read pre-processed training examples in an order of the assigned indices for use in training the machine learning model (step 406). This guarantees that during training, the pre-processed training examples having successive indices are processed by the machine learning model one after another in a fixed and trackable order. The system can train the machine learning model for multiple training steps. At each training step, the system applies a gradient-based update to the parameters of the machine learning model based on computing an objective function to evaluate the overall quality of the training outputs generated by the machine learning model from processing a batch of pre-processed training examples having successive indices.

Figure 5:
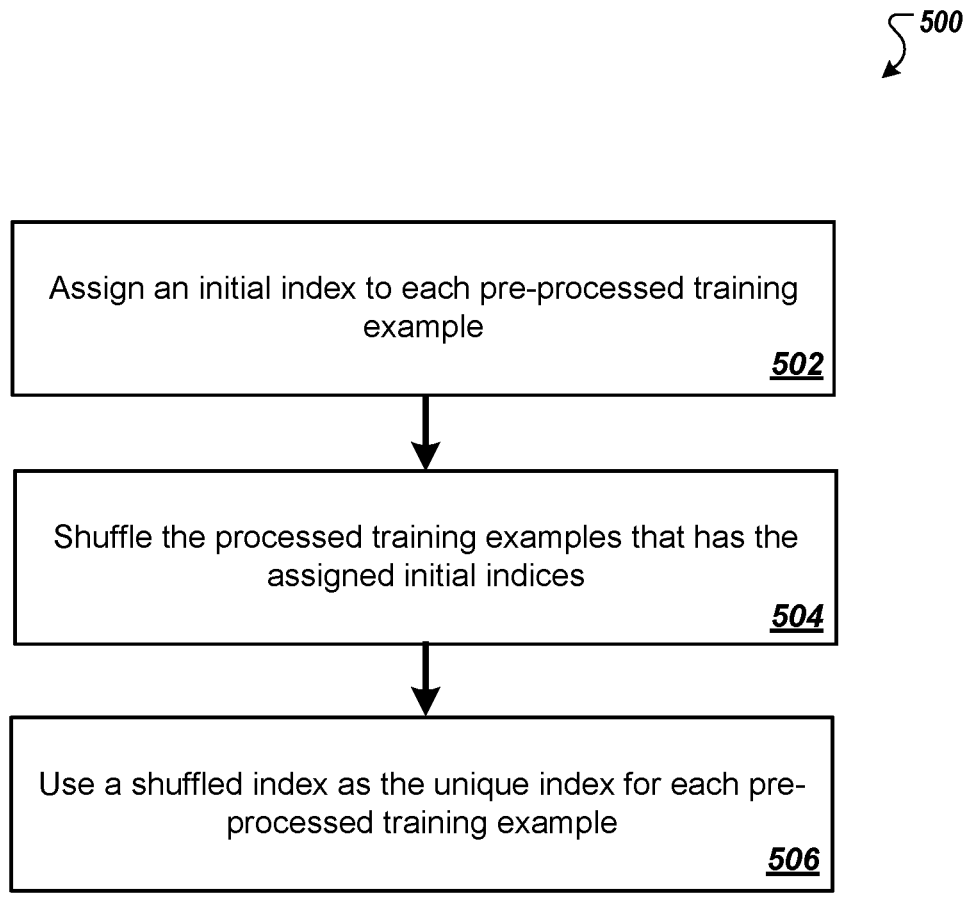
FIG. 5 is a flow diagram of an example process for assigning a unique index to each pre-processed training example.

FIG. 5 is a flow diagram of an example process 500 for assigning a unique index to each pre-processed training example. For convenience, the process 500 will be described as being performed by a system of one or more computers located in one or more locations. For example, a system, e.g., the training system 100 of FIG. 1, appropriately programmed in accordance with this specification, can perform the process 500.

The system assigns an initial index to each pre-processed training example based on a position of the raw training example in the raw data source (step 502). For example, the system can assign each successive pre-processed training example a monotonically increasing integer value as its initial index.

The system shuffles the processed training examples that has the assigned initial indices (step 504). Shuffling the processed training examples means changing their assigned initial indices to new, shuffled indices. The shuffling can be random, pseudo-random, or can follow some predefined (e.g., cyclic) pattern.

The system uses a shuffled index as the unique index for each pre-processed training example (step 506).

Figure 6:
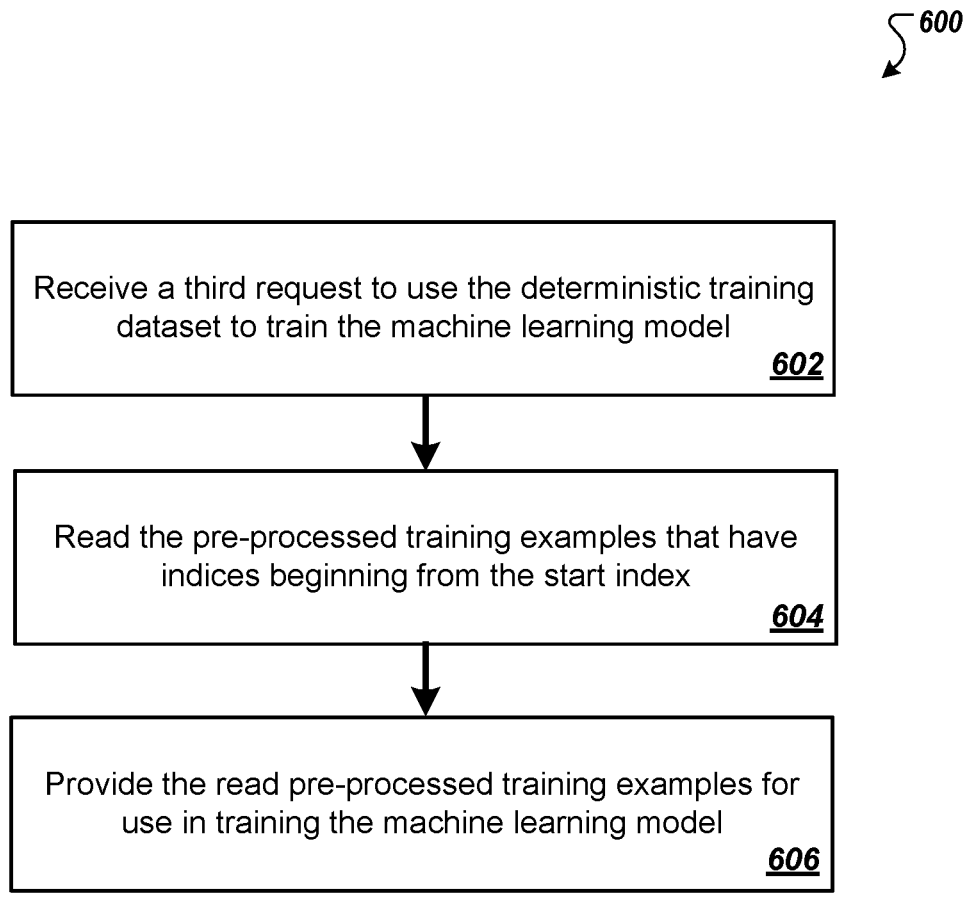
FIG. 6 is a flow diagram of another example process for using a deterministic training dataset to train a machine learning model.

FIG. 6 is a flow diagram of another example process 600 for using a deterministic training dataset to train a machine learning model for any of the machine learning tasks described above. For convenience, the process 600 will be described as being performed by a system of one or more computers located in one or more locations. For example, a system, e.g., the training system 100 of FIG. 1, appropriately programmed in accordance with this specification, can perform the process 600.

The system receives a third request to use the deterministic training dataset to train the machine learning model (step 602). The third request can specify a start index that is identical to the start index specified in the second request, which is received at step 402 of process 400. For example, the system may receive such a request in cases where the training process manager decides to replay a previous training step, e.g., due to training stability issues or other performance issues.

In response to receiving the third request, the system reads, from the cache directory, the pre-processed training examples (step 604). In particular, the system reads pre-processed training examples that have indices beginning from the start index and that are identical to the pre-processed training examples that were read in response to receiving the second request.

The system provides the read inputs for use in training the machine learning model (step 606). In particular, the system provides the pre-processed training examples in an order of the assigned indices, which is identical to the order in which these pre-processed training examples were provided in response to receiving the second request in process 400.

Assuming that the training has proceeded to a later training step by the time the third request was received, because the third request specifies a start index associated with a previous training step, the system first restores the parameter values of the machine learning model that have been checkpointed at the previous training step. The system will then process the pre-processed training examples using the machine learning model in accordance with the restored parameter values. The machine learning model is therefore guaranteed to generate training outputs during the replayed training step that are identical to those generated the previous training step.

Figure 7:
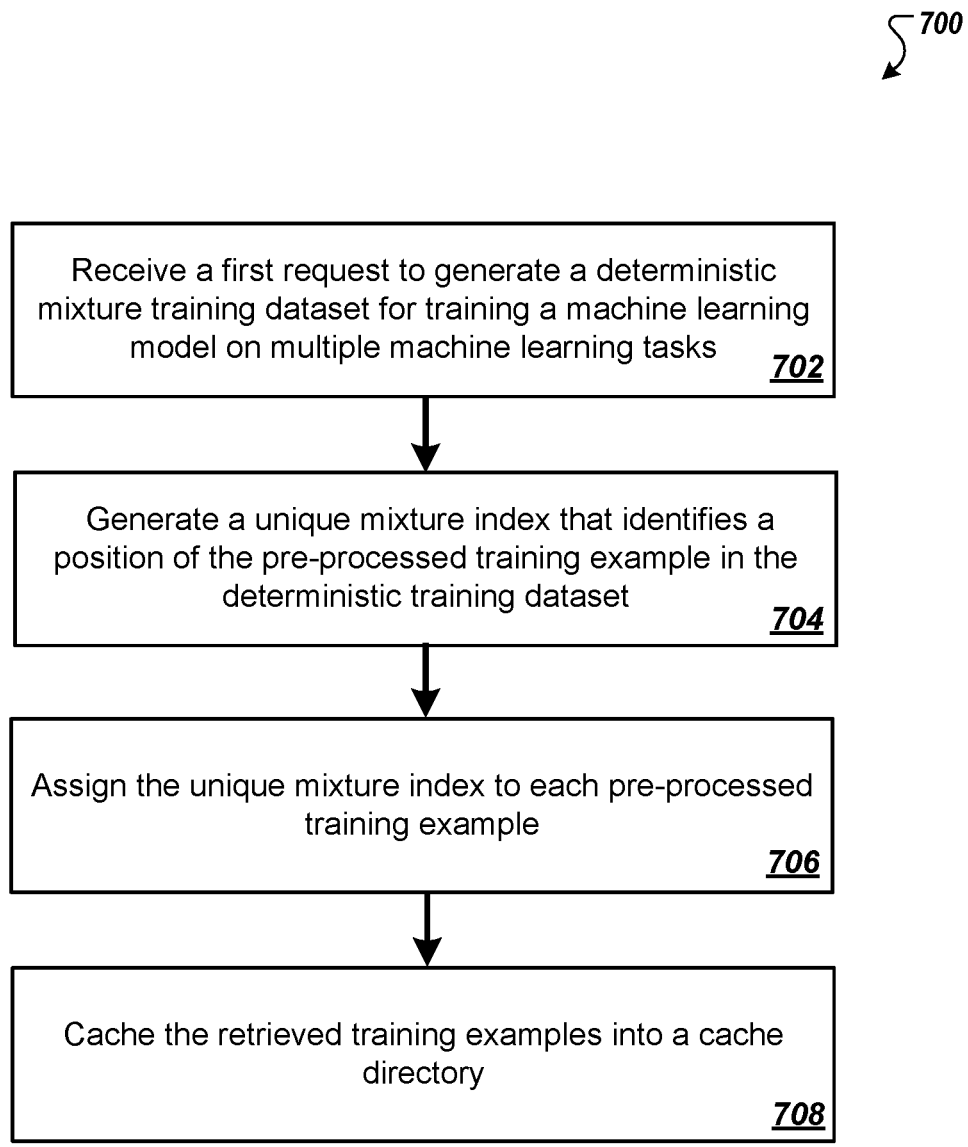
FIG. 7 is a flow diagram of an example process for generating a deterministic mixture training dataset.

FIG. 7 is a flow diagram of an example process 700 for generating a deterministic mixture training dataset. For convenience, the process 700 will be described as being performed by a system of one or more computers located in one or more locations. For example, a system, e.g., the training system 100 of FIG. 1, appropriately programmed in accordance with this specification, can perform the process 700. The generated deterministic mixture training dataset may be used for training a neural network for a plurality machine learning tasks, such as those described above.

The system receives a first request to generate a deterministic mixture training dataset for training a machine learning model on multiple machine learning tasks (step 702). The first request can identify multiple deterministic training datasets, where each identified deterministic training datasets can represent a different machine learning task. As described above, such a deterministic training dataset can be generated by performing process 300 of FIG. 3. The request can identify can also identify a cache directory. The cache directory identifies the memory locations of the cache into which the deterministic mixture training dataset should be stored. The cache directory can be the same as or different than a source cache directory that stores the multiple deterministic training datasets identified in the first request.

In some cases, the first request also specifies a respective start sub-task index of a pre-processed training example for each deterministic training dataset, which indicates a beginning index of the pre-processed training example within deterministic training dataset that should be included in the deterministic mixture training dataset.

In response to receiving the first request, the system generates, for each pre-processed training example retrieved from each deterministic training dataset, a unique mixture index (step 704). The unique mixture index identifies a position of the pre-processed training example in the deterministic training dataset and identifies one of the multiple machine learning tasks that is represented by the deterministic training dataset.

In some cases, the system retrieves all of the pre-processed training example from each identified deterministic training dataset and then generates such a unique mixture index for each retrieved pre-processed training example. In other cases, the system retrieves a subset of the pre-processed training example from each identified deterministic training dataset and then generates such a unique mixture index for each retrieved pre-processed training example in the subset.

For example, in cases where the first request also specifies a respective start sub-task index, the system will retrieve, from each deterministic training dataset, pre-processed training examples that have indices beginning from the respective start sub-task index (and skip any pre-processed training examples that have indices smaller than the respective start sub-task index).

As another example, in order to generate a dataset balanced deterministic mixture training dataset, the system can record a total number of pre-processed training examples retrieved from the deterministic training dataset that has the smallest size among the multiple deterministic training datasets, and correspondingly retrieve, from each of the remaining deterministic training datasets, no more than the total number of pre-processed training examples (and skip any remaining pre-processed training examples in those larger deterministic training datasets). In this example, the system can ensure that the deterministic mixture training dataset generated in response to the first request balances any size difference between the multiple deterministic training datasets to improve the quality of the training.

In some cases, the unique mixture index assigned to each pre-processed training example is a tuple of an index of the machine learning task represented by the deterministic training dataset and an index of the pre-processed training example in the deterministic training dataset. Unlike the index assigned to the pre-processed training example, which is typically numeric as described above (for ease of training diagnostics), the index of the machine learning task can be any of a variety of indices including, e.g., a numeric index, a text index, e.g., an alphabetical index, an alphanumeric index, or a combination thereof. For example, the system can generate, for each pre-processed training example, a unique mixture index that is a tuple of (i) a text index of the machine learning task represented by a deterministic training dataset that includes the pre-processed training example, followed by (ii) an integer index of the pre-processed training example in the deterministic training dataset (as generated at step 306 of process 300).

The system assigns the unique mixture index to each pre-processed training example (step 706).

The system caches the retrieved training examples into a cache directory (step 708). The system can do this by writing the pre-processed training examples into a persistent file format in an order of the assigned mixture indices. For example, the persistent file format can be an SSTable format.

Figure 8:
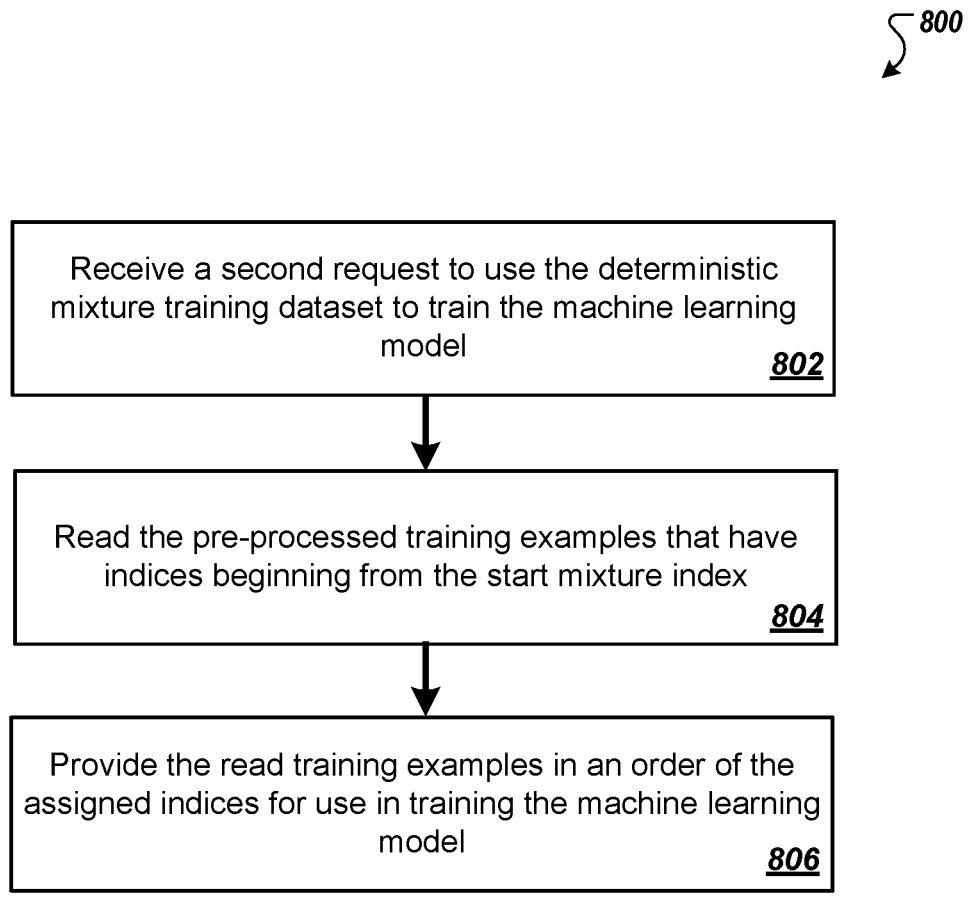
FIG. 8 is a flow diagram of an example process for using a deterministic mixture training dataset to train a machine learning model.

FIG. 8 is a flow diagram of an example process 800 for using a deterministic mixture training dataset to train a machine learning model for a plurality of machine learning tasks, such as those described above. For convenience, the process 400 will be described as being performed by a system of one or more computers located in one or more locations. For example, a system, e.g., the training system 800 of FIG. 1, appropriately programmed in accordance with this specification, can perform the process 800.

The system receives a second request to use the deterministic mixture training dataset to train the machine learning model (step 802). The second request can specify a start mixture index. For example, the start mixture index can indicate both the machine learning task on which the model should be trained, as well as the beginning index of the deterministic mixture training dataset represented by the machine learning task.

In response to receiving the second request, the system reads, from the cache directory, the pre-processed training examples (step 804). In particular, the system reads the pre-processed training examples that have indices beginning from the start mixture index within the deterministic training dataset that represents the machine learning task specified by the second request. The system can read these pre-processed training examples in an order of the assigned indices, such that pre-processed training examples having successive indices are read one after another from the deterministic training dataset.

The system provides the read training examples in an order of the assigned indices for use in training the machine learning model (step 806). The system can train the machine learning model for multiple training steps. At each training step, the system applies a gradient-based update to the parameters of the machine learning model based on computing an objective function to evaluate the overall quality of the training outputs generated by the machine learning model from processing a batch of pre-processed training examples having successive indices.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a JAX framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   receiving a first request to generate a deterministic training dataset, the first request specifying a raw data source and a cache directory;
   in response to receiving the first request:
      transforming raw training examples obtained from the raw data source into pre-processed training examples;
      assigning a unique index to each pre-processed training example, wherein assigning the unique index to each pre-processed training example comprises:
         assigning an initial index to each pre-processed training example based on a position of the raw training example in the raw data source;
         shuffling the pre-processed training examples that have the assigned initial indices to determine a shuffled index for each pre-processed training example; and
         using the shuffled index as the unique index for each pre-processed training example; and
      caching the pre-processed training examples into the cache directory specified in the received first request, including writing the pre-processed training examples into a persistent file format in an order of the assigned indices;
   receiving a second request to use the deterministic training dataset to train a machine learning model, the second request specifying a start index; and
   in response to receiving the second request:
      reading, from the cache directory, the pre-processed training examples that have indices beginning from the start index; and providing the read pre-processed training examples in an order of the assigned indices for use in training the machine learning model.

2. The method of claim 1, wherein transforming the raw training examples obtained from the raw data source into pre-processed training examples comprises:
applying tokenization to the raw training examples.

3. The method of claim 1, wherein the first request further specifies a maximum sequence length, and wherein transforming the raw training examples obtained from the raw data source into pre-processed training examples comprises:
truncating any training inputs, target outputs or both included in the raw training examples that are greater than the maximum sequence length to have the maximum sequence length.

4. The method of claim 1, wherein the persistent file format comprises a sorted strings table (SSTable) format.

5. The method of claim 1, wherein the start index is dependent on a number of training steps that have been performed during the training of the machine learning model, and on a batch size of each batch of training examples used in each training step, and wherein receiving the second request specifying the start index comprises:
receiving data specifying the number of training steps that have been performed, the batch size, or both.

6. The method of claim 5, wherein the number of training steps is dependent on model performance on a particular machine learning task during the training, and wherein the method further comprises determining a particular number of training steps based on a value of a loss function used to train the machine learning model.

7. The method of claim 5, wherein the second request specifies a start index associated with a previous training step, and wherein the method further comprises:
restoring parameter values of the machine learning model that have been checkpointed at the previous training step; and
processing the read pre-processed training examples using the machine learning model in accordance with the restored parameter values.

8. The method of claim 5, wherein the second request specifies a start index associated with a later training step, and wherein reading the pre-processed inputs comprises:
skipping the pre-processed training examples in the cache directory that have indices smaller than the start index.

9. The method of claim 1, wherein the training of the machine learning model is performed using model parallelism techniques, data parallelism techniques, or both.

10. The method of claim 9, wherein the data parallelism techniques comprise a multi-way fully sharded data parallelism technique, and wherein caching the pre-processed training examples into the cache directory comprises writing the pre-processed training examples into multiple SSTables in the order of the assigned indices using a mod sharding technique.

11. The method of claim 9, wherein reading the pre-processed training examples that have indices beginning from the start index comprises:
identifying a shard from multiple shards in the cache directory based on computing a modulo between the start index specified in the received second request and a number of the shards.

12. A computer-implemented method comprising:
receiving a first request to generate a deterministic training dataset, the first request specifying a raw data source and a cache directory;
in response to receiving the first request:
transforming raw training examples obtained from the raw data source into pre-processed training examples;
assigning a unique index to each pre-processed training example; and
caching the pre-processed training examples into the cache directory specified in the received first request, including writing the pre-processed training examples into a persistent file format in an order of the assigned indices;
receiving a second request to use the deterministic training dataset to train a machine learning model, the second request specifying a start index;
in response to receiving the second request:
reading, from the cache directory, the pre-processed training examples that have indices beginning from the start index; and
providing the read pre-processed training examples in an order of the assigned indices for use in training the machine learning model;
receiving a third request to use the deterministic training dataset to train the machine learning model, the third request specifying a start index that is identical to the start index specified in the second request; and
in response to receiving the third request:
reading, from the cache directory, the pre-processed training examples that have indices beginning from the start index and that are identical to the pre-processed training examples that were read in response to receiving the second request; and
providing the read pre-processed training examples for use in training the machine learning model in an identical order in which the read pre-processed training examples were provided in response to receiving the second request.

13. A computer-implemented method comprising:
receiving a first request to generate a deterministic mixture training dataset for training a machine learning model on multiple machine learning tasks, the first request identifying multiple deterministic training datasets and further specifying a respective start sub-task index of a pre-processed training example for each deterministic training dataset;
in response to receiving the first request:
retrieving, from each deterministic training dataset, pre-processed training examples that have indices beginning from the respective start sub-task index;
generating, for each pre-processed training example retrieved from each deterministic training dataset, a unique mixture index that identifies a position of the pre-processed training example in the deterministic training dataset and that identifies one of the multiple machine learning tasks that is represented by the deterministic training dataset;
assigning the unique mixture index to each pre-processed training example; and
caching the retrieved training examples into a cache directory, including writing the retrieved training examples into a persistent file format in an order of the assigned indices;
receiving a second request to use the deterministic mixture training dataset to train the machine learning model, the second request specifying a start mixture index; and in response to receiving the second request:
  reading, from the cache directory, the pre-processed training examples that have indices beginning from the start mixture index; and
  providing the read pre-processed training examples in an order of the assigned indices for use in training the machine learning model.

14. The method of claim 13, wherein the unique mixture index assigned to each pre-processed training example is a tuple of a text index of the machine learning task represented by the deterministic training dataset and an integer index of the pre-processed training example in the deterministic training dataset.

15. The method of claim 13, wherein the cache directory is the same as a source cache directory that stores the multiple deterministic training datasets identified in the first request.

16. The method of claim 13, wherein generating the unique mixture index comprises using dataset balancing techniques to balance any size difference between the multiple deterministic training datasets.

17. A system comprising one or more computers and one or more storage devices storing instructions that are operable, when executed by the one or more computers, to cause the one or more computers to perform operations comprising:
  receiving a first request to generate a deterministic training dataset, the first request specifying a raw data source and a cache directory;
  in response to receiving the first request:
    transforming raw training examples obtained from the raw data source into pre-processed training examples;
    assigning a unique index to each pre-processed training example; and
    caching the pre-processed training examples into the cache directory specified in the received first request, including writing the pre-processed training examples into a persistent file format in an order of the assigned indices;
  receiving a second request to use the deterministic training dataset to train a machine learning model, the second request specifying a start index;
  in response to receiving the second request:
    reading, from the cache directory, the pre-processed training examples that have indices beginning from the start index; and
    providing the read pre-processed training examples in an order of the assigned indices for use in training the machine learning model;
  receiving a third request to use the deterministic training dataset to train the machine learning model, the third request specifying a start index that is identical to the start index specified in the second request; and
  in response to receiving the third request:
    reading, from the cache directory, the pre-processed training examples that have indices beginning from the start index and that are identical to the pre-processed training examples that were read in response to receiving the second request; and
    providing the read pre-processed training examples for use in training the machine learning model in an identical order in which the read pre-processed training examples were provided in response to receiving the second request.

18. The system of claim 17, wherein the training of the machine learning model is performed using model parallelism techniques, data parallelism techniques, or both.

19. The system of claim 17, wherein the data parallelism techniques comprise a multi-way fully sharded data parallelism technique, and wherein caching the pre-processed training examples into the cache directory comprises writing the pre-processed training examples into multiple SSTables in the order of the assigned indices using a mod sharding technique.

20. The system of claim 17, wherein reading the pre-processed training examples that have indices beginning from the start index comprises:
  identifying a shard from multiple shards in the cache directory based on computing a modulo between the start index specified in the received second request and a number of the shards.

21. A system comprising one or more computers and one or more storage devices storing instructions that are operable, when executed by the one or more computers, to cause the one or more computers to perform operations comprising:
  receiving a first request to generate a deterministic training dataset, the first request specifying a raw data source and a cache directory;
  in response to receiving the first request:
    transforming raw training examples obtained from the raw data source into pre-processed training examples;
    assigning a unique index to each pre-processed training example, wherein assigning the unique index to each pre-processed training example comprises:
      assigning an initial index to each pre-processed training example based on a position of the raw training example in the raw data source;
      shuffling the pre-processed training examples that have the assigned initial indices to determine a shuffled index for each pre-processed training example; and
      using the shuffled index as the unique index for each pre-processed training example; and
    caching the pre-processed training examples into the cache directory specified in the received first request, including writing the pre-processed training examples into a persistent file format in an order of the assigned indices;
  receiving a second request to use the deterministic training dataset to train a machine learning model, the second request specifying a start index; and
  in response to receiving the second request:
    reading, from the cache directory, the pre-processed training examples that have indices beginning from the start index; and
    providing the read pre-processed training examples in an order of the assigned indices for use in training the machine learning model.

22. The system of claim 21, wherein transforming the raw training examples obtained from the raw data source into pre-processed training examples comprises:
  applying tokenization to the raw training examples.

23. The system of claim 21, wherein the first request further specifies a maximum sequence length, and wherein transforming the raw training examples obtained from the raw data source into pre-processed training examples comprises:

truncating any training inputs, target outputs or both included in the raw training examples that are greater than the maximum sequence length to have the maximum sequence length.

24. The system of claim 21, wherein the persistent file format comprises a sorted strings table (SSTable) format.

25. A system comprising one or more computers and one or more storage devices storing instructions that are operable, when executed by the one or more computers, to cause the one or more computers to perform operations comprising:
  receiving a first request to generate a deterministic mixture training dataset for training a machine learning model on multiple machine learning tasks, the first request identifying multiple deterministic training datasets and further specifying a respective start sub-task index of a pre-processed training example for each deterministic training dataset;
  in response to receiving the first request:
    retrieving, from each deterministic training dataset, pre-processed training examples that have indices beginning from the respective start sub-task index;
    generating, for each pre-processed training example retrieved from each deterministic training dataset, a unique mixture index that identifies a position of the pre-processed training example in the deterministic training dataset and that identifies one of the multiple machine learning tasks that is represented by the deterministic training dataset;
    assigning the unique mixture index to each pre-processed training example; and
    caching the retrieved training examples into a cache directory, including writing the retrieved training examples into a persistent file format in an order of the assigned indices;
  receiving a second request to use the deterministic mixture training dataset to train the machine learning model, the second request specifying a start mixture index; and
  in response to receiving the second request:
    reading, from the cache directory, the pre-processed training examples that have indices beginning from the start mixture index; and
    providing the read pre-processed training examples in an order of the assigned indices for use in training the machine learning model.

26. The system of claim 25, wherein the unique mixture index assigned to each pre-processed training example is a tuple of a text index of the machine learning task represented by the deterministic training dataset and an integer index of the pre-processed training example in the deterministic training dataset.

27. The system of claim 25, wherein the cache directory is the same as a source cache directory that stores the multiple deterministic training datasets identified in the first request.

* * * * *